(12) United States Patent
Haller et al.

(10) Patent No.: US 10,773,551 B1
(45) Date of Patent: Sep. 15, 2020

(54) CASTER WHEEL

(71) Applicant: Snap-on Incorporated, Kenosha, WI (US)

(72) Inventors: Mitchell J. Haller, Pleasant Prairie, WI (US); Alex G. Bournoville, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 16/366,146

(22) Filed: Mar. 27, 2019

(51) Int. Cl.
*B60B 33/00* (2006.01)

(52) U.S. Cl.
CPC ...... *B60B 33/0086* (2013.01); *B60B 33/0039* (2013.01); *B60B 33/0049* (2013.01); *B60B 33/006* (2013.01); *B60B 2360/50* (2013.01); *B60B 2900/531* (2013.01)

(58) Field of Classification Search
CPC . Y10T 16/195; Y10T 16/196; B60B 33/0094; B60B 33/0039; B60B 33/0049; B60B 33/0057; B60B 33/006; B60B 33/0068; B60B 33/0084; B60B 33/0092; B60B 33/025; B60B 33/021; B60B 33/0042; B60B 33/0078; B60B 33/0086; B60B 37/10; B60B 2200/222; B60B 2200/22; B60B 2200/242; B60B 2200/40; B60B 2900/531; B60B 2900/321; B60B 2360/50; A61G 7/0528
See application file for complete search history.

(56) References Cited

U.S. PATENT DOCUMENTS

| | | | |
|---|---|---|---|
| 2,687,546 A | 8/1954 | Oppenheimer | |
| 3,467,981 A | 9/1969 | Peter | |
| 3,571,842 A | 3/1971 | Fricke | |
| 3,652,103 A | 3/1972 | Higgs | |
| 3,772,733 A | 11/1973 | Stosberg et al. | |
| 4,110,866 A * | 9/1978 | Ishii | B60B 33/0042 16/35 R |
| 4,199,043 A | 4/1980 | Lankester et al. | |
| 4,479,566 A * | 10/1984 | Ishii | B60B 33/021 16/35 R |
| 4,679,662 A | 7/1987 | Nordskog | |
| 5,181,587 A | 1/1993 | Masatoshi | |
| 5,232,071 A | 8/1993 | Kawanabe | |
| 5,373,917 A | 12/1994 | Kamman | |
| 6,219,881 B1 * | 4/2001 | Wen | B60B 33/0018 16/35 R |
| 6,619,438 B1 * | 9/2003 | Yang | B60B 33/0021 188/1.12 |

(Continued)

FOREIGN PATENT DOCUMENTS

GB 1211383 A 11/1970
GB 1439500 A 6/1976
(Continued)

OTHER PUBLICATIONS

Combined Search and Examination Report for Application No. GB1914204.1 dated Feb. 28, 2020, 7 pages.

*Primary Examiner* — Chuck Y Mah
(74) *Attorney, Agent, or Firm* — Seyfarth Shaw LLP

(57) ABSTRACT

A caster wheel that locks and unlocks using a push-lock, push-unlock mechanism, similar to a push button pen. The mechanism can be placed on the side of the wheel to be easily accessible to the user and to allow a convenient locking of the caster wheel.

18 Claims, 8 Drawing Sheets

(56) References Cited

U.S. PATENT DOCUMENTS

| | | | |
|---|---|---|---|
| 6,726,226 B2 | 4/2004 | Liu | |
| 7,182,178 B2* | 2/2007 | Chung | B60B 33/0018 188/1.12 |
| 7,383,925 B2 | 6/2008 | Chen | |
| 7,546,908 B2* | 6/2009 | Chang | A45C 5/145 16/35 R |
| 7,708,119 B2 | 5/2010 | Chen | |
| 7,930,802 B2* | 4/2011 | Tsai | B60B 33/0007 16/35 R |
| 7,937,805 B2* | 5/2011 | Tsai | B60B 33/0021 16/35 D |
| 7,987,553 B2* | 8/2011 | Lin | B60B 33/0042 16/35 R |
| 8,117,715 B2* | 2/2012 | Tsai | B60B 33/0042 16/35 R |
| 9,266,393 B2* | 2/2016 | Yeo | B60B 33/025 |
| 9,533,530 B2 | 1/2017 | Hartenstine et al. | |
| 2009/0019669 A1* | 1/2009 | Jones | B60B 33/0018 16/35 R |
| 2019/0160869 A1* | 5/2019 | Stoehr | B60B 19/00 |

FOREIGN PATENT DOCUMENTS

| | | |
|---|---|---|
| GB | 2245163 A | 1/1992 |
| GB | 2255500 A | 11/1992 |

\* cited by examiner

CASTER WHEEL

TECHNICAL FIELD OF THE INVENTION

The present invention relates generally to wheel locks. More specifically, the present invention relates to a caster wheel with a push-mechanism to lock and unlock the wheel.

BACKGROUND OF THE INVENTION

Roll cabs and other portable devices often have wheels attached to a bottom portion to allow the device to be movable. For example, many roll cabs include a caster wheel that is attached to the roll cab to allow it to move. The wheels may swivel in a 360-degree manner to allow for maximum maneuverability, or one or more wheels may be locked in a certain position so that they do not swivel, but where the wheels are still rotatable to allow more guided movement of the roll cab.

Some caster wheels have locks that prevent the wheels from rotating, thereby preventing the roll cab from moving from a specified position. For example, some caster wheels have a foot pedal that frictionally engages and thus locks the wheels into place.

SUMMARY OF THE INVENTION

The present invention broadly comprises a caster wheel for a roll cab or other movable device that locks and unlocks using a push-lock, push-unlock mechanism, similar to a push button pen. The mechanism can be placed on a side of the wheel to be accessible to a user and to allow locking and unlocking of the caster wheel.

For example, the present invention broadly comprises a caster including a wheel, a rod about which the wheel rotates, a frame coupled to the rod, a first horn coupled to the frame and including a first opening allowing the rod to insert therethrough, a second horn coupled to the frame and including a second opening allowing the rod to insert therethrough, a lock mechanism including a push-lock, push-unlock mechanism coupled to the first horn and including a button and a spring biasing the button away from the wheel, and a wing coupled to the lock mechanism. The wing is pushed inward toward the wheel when the lock mechanism is in the locked state, and the wing is allowed to move away from the wheel under bias of the spring when the lock mechanism is in the unlocked state.

The present invention also broadly comprises a caster including a wheel, a lock mechanism including a push-lock, push-unlock mechanism coupled to the wheel and including a button and a spring biasing the button away from the wheel, and a wing coupled to the lock mechanism. The wing is pushed inwardly towards the wheel when the lock mechanism is in the locked state, and the wing is allowed to move away from the wheel under bias of the spring when the lock mechanism is in the unlocked state.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
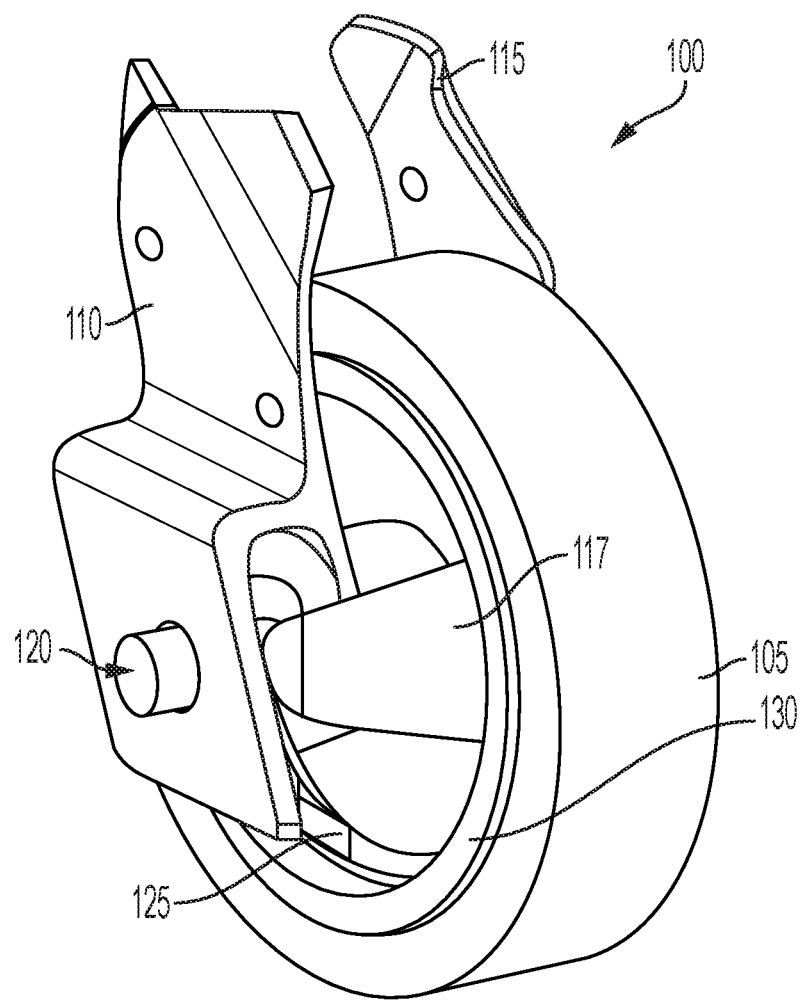
FIG. 1 is a front perspective view of a caster wheel according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a caster wheel for a roll cab or other moveable device that locks and unlocks more conveniently. For example, the mechanism can include a push-lock, push-unlock mechanism, similar to a push button pen. The mechanism can be placed on the side of the wheel to be accessible to the user and to allow a convenient locking of the caster wheel.

Figure 2:
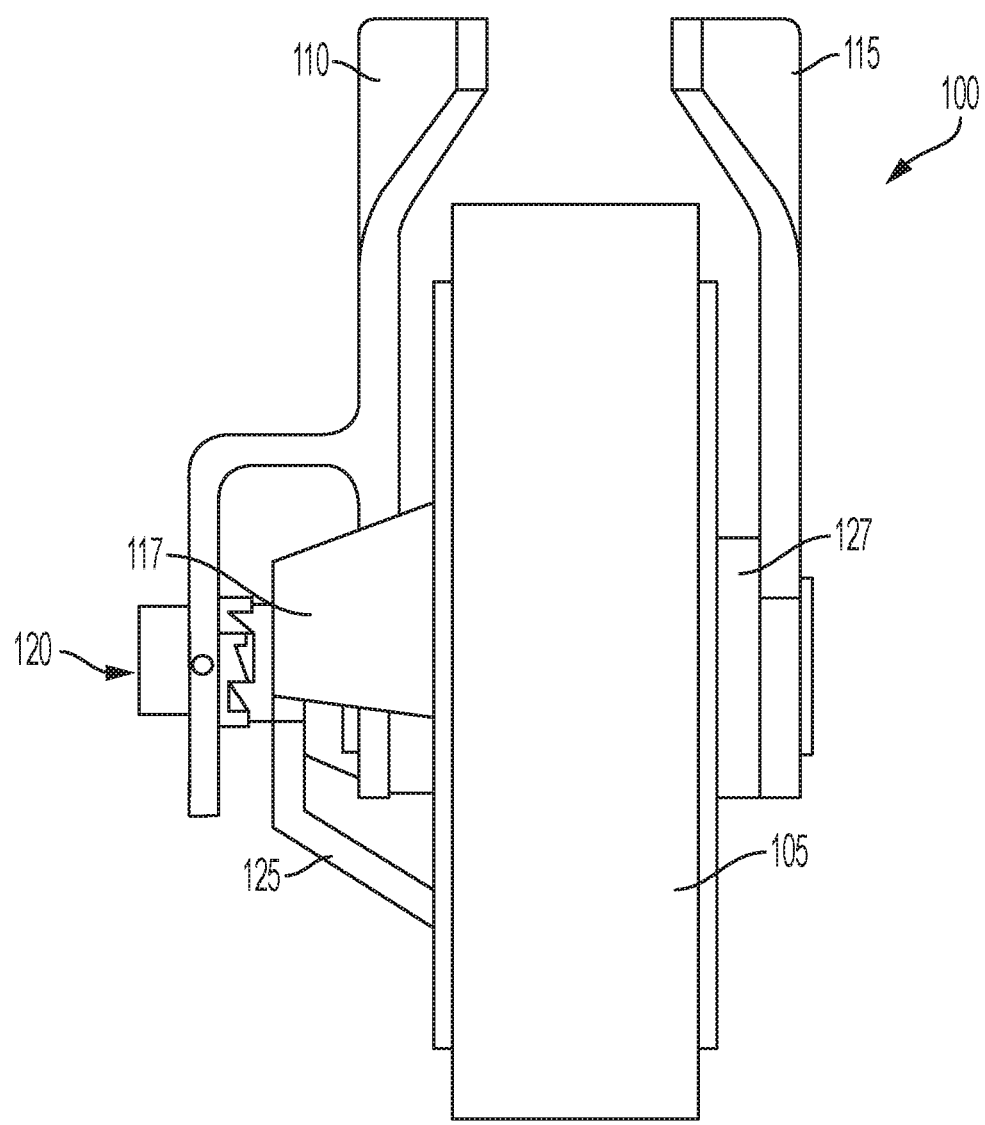
FIG. 2 is a side view of a caster wheel according to an embodiment of the present invention.

As shown in FIGS. 1 and 2, a caster 100 can include a wheel 105 with a first horn 110 located away from the wheel 105, and a second horn 115 located adjacent to the wheel 105. The first 110 and second 115 horns can be coupled to the wheel 105 by a frame or rim 117 that acts as the structural backbone of the caster 100. A lock mechanism 120 can be provided that selectively locks the wheel with a push-lock, push-unlock mechanism, similar to a push button pen. As shown, the lock mechanism 120 can include a wing 125 that frictionally engages other components of the caster 100 to prevent the wheel 105 from rotating.

Figure 3:
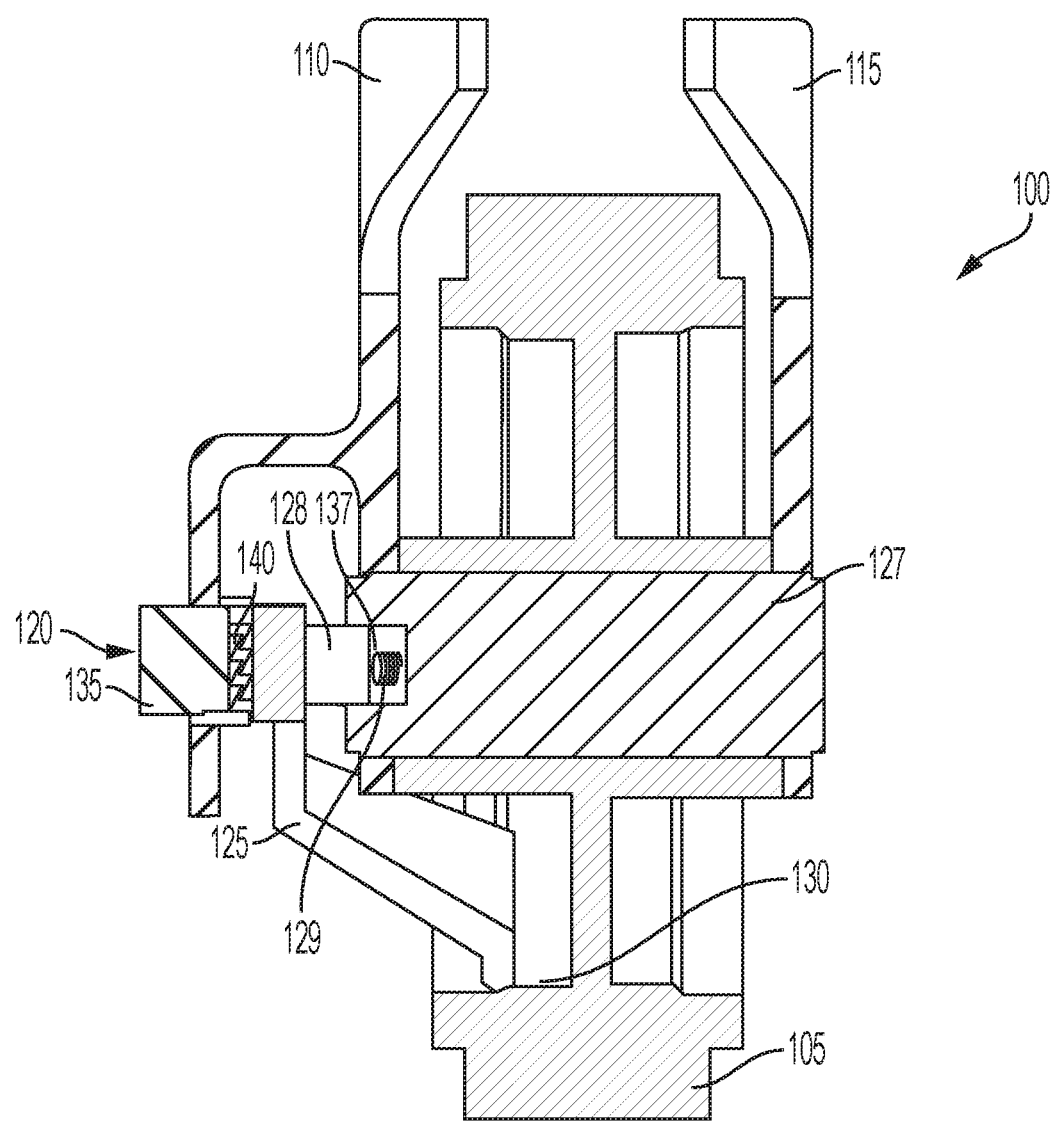
FIG. 3 is a side sectional view of a caster wheel according to an embodiment of the present invention.

As shown in FIG. 3, the wheel 105 can be rotatably coupled to the frame 117 by an axle 127. The wheel 105 can therefore rotate about the axle 127 and swivel in a 360-degree manner with a swivel coupling (not shown), as is well known in the art. For example, the axle 127 can be coupled to the frame 117 and allow rotation of the wheel 105. In an embodiment, the lock mechanism 120 locks the wheel 105 from rotating about the axle 127, not from swiveling about the swivel coupling. In doing so, the lock mechanism 120 prevents the roll cab or other device to which the caster 100 is coupled from rolling.

As shown in FIG. 3, the lock mechanism 120 operates by pushing an extension 128 into a gap 129, while simultaneously pushing the wing 125 into a ring 130. For example, the ring 130 can be made of a rubber or other frictional material such that, when the wing 125 engages the ring 130, the wing 125 can provide frictional resistance to the wheel 105 rotating about the rod 127. The lock mechanism 120 includes a button 135 that operates similar to a push button pen where, when pushed inwardly, the lock mechanism 120 pushes the extension 128 and wing 125 inwardly, thereby creating frictional resistance of the wing 125, and when the button 135 is pushed again, retracts from the gap 129 under the bias of a spring 137 to remove the locking action and also to remove the wing 125 from the ring 130. In this manner, a user can easily lock the caster 100 into place by pushing once on the button 135, and then unlocking the caster 100 by pushing once more on the button 135. For example, the user may push inwardly on the button 135, causing it to engage with an engaging member 140 by rotating against the teeth of the engaging member 140, similar to a cam mechanism, and therefore locking in place. The wing 125 is pushed inwardly towards the wheel 105 when the lock mechanism 120 is in the locked state, and the wing 125 is allowed to move away from the wheel 105 under bias of the spring 137 when the lock mechanism 120 is in the unlocked state.

As shown, the axle 127 can be any device that allows the wheel to rotate and therefore allow the roll cab or device to be more easily movable. The axle 127 can include the gap 129 for the extension 128 to insert into against the bias of the spring 129.

The spring 137 can be any bias member and not necessarily a "spring" as that term is conventionally used. For example, the spring can be any elastic body, material, or substance; or can be a leaf spring, coil spring, or any other conventional spring. In an embodiment, the spring 137 is a coil spring.

Figure 4A:
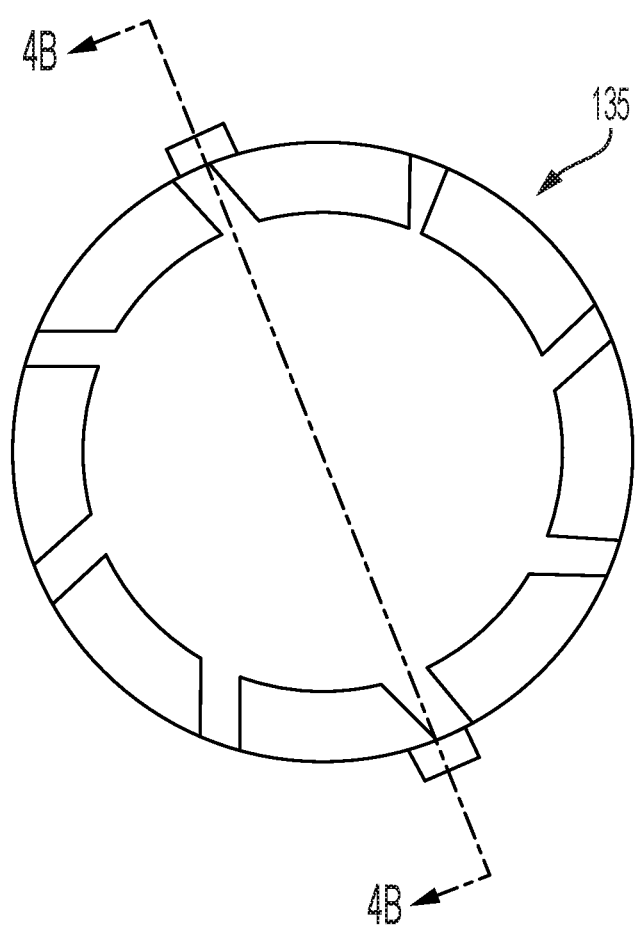
FIG. 4A is a bottom view of a button according to an embodiment of the present invention.
Figure 4B:
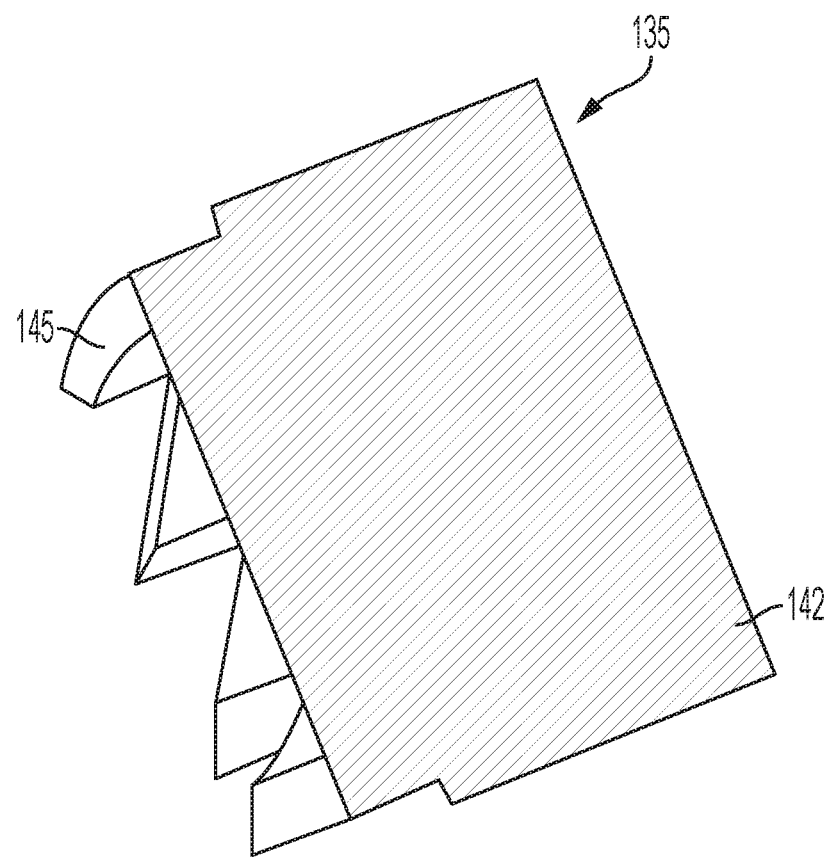
FIG. 4B is a side sectional view of a button as cut along the line shown in FIG. 4A according to an embodiment of the present invention.
Figure 5A:
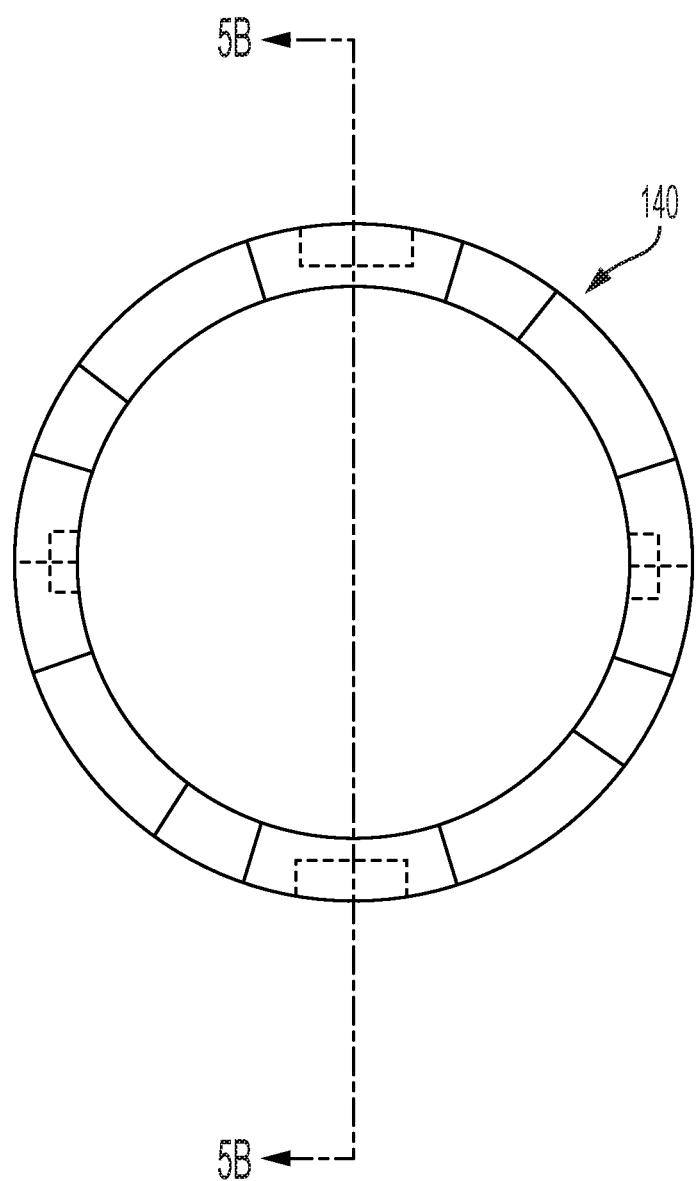
FIG. 5A is a bottom view of an engaging member according to an embodiment of the present invention.
Figure 5B:
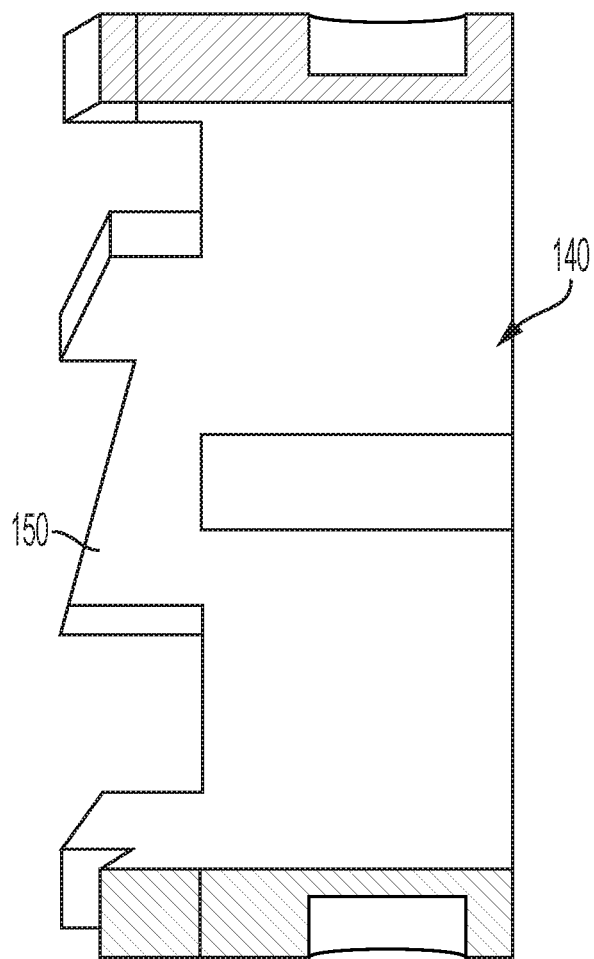
FIG. 5B is a side sectional view of an engaging member as cut along the line shown in FIG. 5A according to an embodiment of the present invention.

FIGS. 4A and 4B illustrate the button 135 according to at least some of the presently disclosed embodiments; and FIGS. 5A and 5B illustrate the engaging member 140 according to at least some embodiments. As shown, the button 135 can include a button base 142 that a user can push inwardly to cause the locking mechanism 120 to lock or unlock, and button teeth 145 that engage corresponding engaging member teeth 150 on the engaging member 140.

Figure 6:
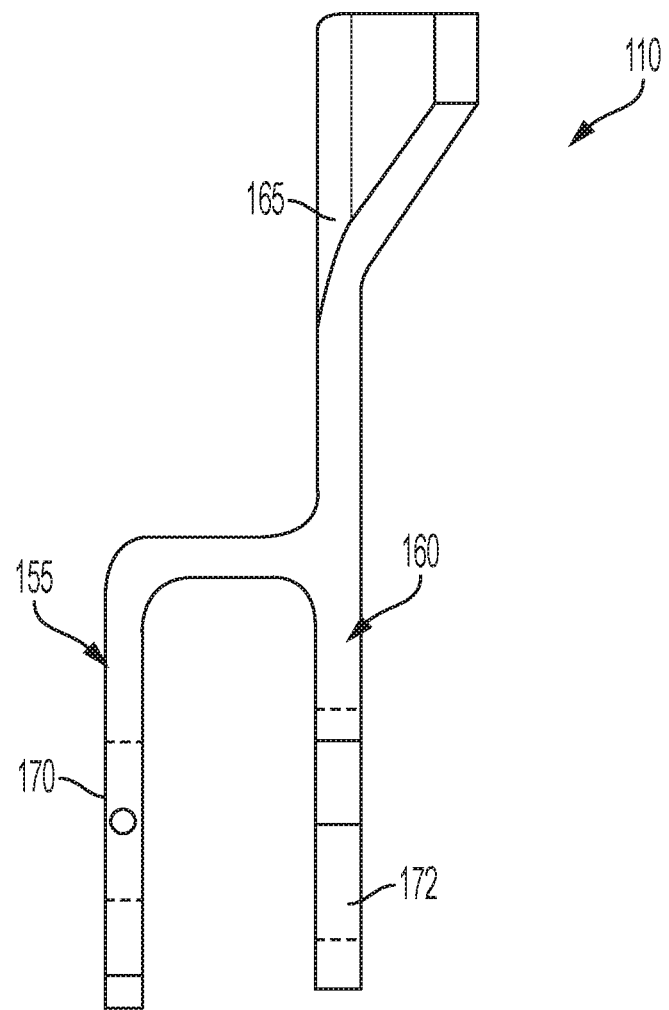
FIG. 6 is a side view of an outer horn according to an embodiment of the present invention.

FIG. 6 is a side view of a first horn 110 according to at least some of the presently disclosed embodiments. As shown, the first horn 110 can include a first portion 155 located away from the wheel 105 and a second portion 160 located closer to the wheel 160 as compared to the first portion 155. For example, the first 155 and second 160 portions can be parallel to one another. The first horn 110 can include a shield 165 for preventing debris from being distributed away from the caster 100, and the first 155 and second 160 portions can respectively include first 170 and second 172 openings. For example, the first opening 170 can allow for the button base 142 to extend through and slide within the first opening 170, whereas the second opening 172 can allow for the axle 127 to extend through the second horn 115. The remainder of the button 135, including the button teeth 145; and the engaging member 140, can be located between the first 170 and second 172 openings of the first horn 110. The wing 125 can also be located partially between the first 170 and second 172 openings, extending below the first horn 110 and towards the wheel 105, as shown in FIG. 3. The second horn 115 is structurally and functionally similar to the first horn 110, except the second horn 115 lacks the second portion 160 situated to the outside of the first horn 110.

It will be appreciated that while the present invention is described as being used in a caster for a roll cab, the present invention is not so limited and can be used with any type of device where mobility is required, including, but not limited to, roll cabs, chairs, tables, desks, wheeled dollies, etc.

As used herein, the term "push-lock, push-unlock mechanism" means any mechanism that locks when pushed a first time, and that unlocks when pushed a second time. One of ordinary skill would be familiar with the structures corresponding to such a mechanism, but such structures would include a cam and rod mechanism or any other commonly used with push button pens and other such devices.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A caster comprising:
a wheel;
an axle about which the wheel rotates;
a first horn including a first opening allowing the axle to insert therethrough;
a second horn including a second opening allowing the axle to insert therethrough;
a lock mechanism including a push-lock, push-unlock mechanism coupled to the first horn and including a button and a spring adapted to bias the button away from the wheel, wherein the lock mechanism is selectively disposable in either of locked and unlocked states; and
a wing coupled to the lock mechanism,
wherein the wing is pushed towards the wheel by the lock mechanism to provide frictional resistance to the wheel when the lock mechanism is disposed in the locked state, and wherein the wing is allowed to move away from the wheel under bias of the spring when the lock mechanism is disposed in the unlocked state.

2. The caster of claim 1, further comprising a ring disposed around the wheel, and wherein the wing engages the ring when the lock mechanism is in the locked state.

3. The caster of claim 2, wherein the ring is comprised of a frictional material.

4. The caster of claim 1, wherein the button includes a button base and button teeth extending from the button base.

5. The caster of claim 4, wherein the lock mechanism further includes an engagement member having engagement member teeth that engage the button teeth when the lock mechanism is in the locked state.

6. The caster of claim 5, wherein the wing is coupled to the engagement member and includes an extension, and wherein the axle includes a gap allowing insertion of the extension when the lock mechanism is in the locked state.

7. The caster of claim 1, wherein the first horn includes first and second portions extending substantially parallel to one another wherein the first portion includes the first opening and wherein the second portion includes a third opening adapted to allow insertion of the button.

8. The caster of claim 7, wherein the lock mechanism is located between the first and second portions.

9. The caster of claim 8, wherein the wing extends from the lock mechanism towards the wheel.

10. A lock mechanism for a caster having a wheel, an axle about which the wheel rotates, a first horn including a first opening allowing the axle to insert therethrough, and a second horn including a second opening allowing the axle to insert therethrough, the lock mechanism comprising:
 a push-lock, push-unlock mechanism coupled to the first horn and including a button and a spring that is adapted to bias the button away from the wheel; and
 a wing,
 wherein the wing is pushed towards the wheel to provide frictional resistance to the wheel when the lock mechanism is disposed in a locked state, and wherein the wing is allowed to move away from the wheel under bias of the spring when the lock mechanism is disposed in an unlocked state.

11. The lock mechanism of claim 10, further comprising a ring disposed around the wheel, and wherein the wing engages the ring when the lock mechanism is in the locked state.

12. The lock mechanism of claim 11, wherein the ring is comprised of a frictional material.

13. The lock mechanism of claim 10, wherein the button includes a button base and button teeth extending from the button base.

14. The lock mechanism of claim 13, further comprising an engagement member having engagement member teeth that engage the button teeth when the lock mechanism is in the locked state.

15. The lock mechanism of claim 14, wherein the wing is coupled to the engagement member and includes an extension, and wherein the axle includes a gap allowing insertion of the extension when the lock mechanism is in the locked state.

16. The lock mechanism of claim 10, wherein the first horn includes first and second portions extending substantially parallel to one another, wherein the first portion includes the first opening and wherein the second portion includes a third opening adapted to allow insertion of the button.

17. The lock mechanism of claim 16, wherein the lock mechanism is disposed between the first and second portions.

18. The lock mechanism of claim 17, wherein the wing is coupled to the lock mechanism and extends toward the wheel.

* * * * *